(12) United States Patent
Mermillod et al.

(10) Patent No.: US 12,392,942 B2
(45) Date of Patent: Aug. 19, 2025

(54) DISPLAY UNIT

(71) Applicant: VALEO COMFORT AND DRIVING ASSISTANCE, Créteil (FR)

(72) Inventors: Pierre Mermillod, Créteil (FR); Thomas Avisse, Créteil (FR); Pierre-Alain Tremblin, Créteil (FR)

(73) Assignee: VALEO COMFORT AND DRIVING ASSISTANCE, Créteil (FR)

( * ) Notice: Subject to any disclaimer, the term of this patent is extended or adjusted under 35 U.S.C. 154(b) by 471 days.

(21) Appl. No.: 17/924,251

(22) PCT Filed: Apr. 28, 2021

(86) PCT No.: PCT/EP2021/061191
§ 371 (c)(1),
(2) Date: Nov. 9, 2022

(87) PCT Pub. No.: WO2021/228557
PCT Pub. Date: Nov. 18, 2021

(65) Prior Publication Data
US 2023/0182569 A1 Jun. 15, 2023

(30) Foreign Application Priority Data
May 13, 2020 (FR) ........................... 2004693

(51) Int. Cl.
*G02B 5/20* (2006.01)
*B60K 35/00* (2006.01)
(Continued)

(52) U.S. Cl.
CPC ................ *B60K 35/00* (2013.01); *G02B 5/20* (2013.01); *G02B 27/4205* (2013.01);
(Continued)

(58) Field of Classification Search
CPC ........ B60K 35/00; B60K 35/10; B60K 35/28; B60K 35/212; B60K 2360/25;
(Continued)

(56) References Cited

U.S. PATENT DOCUMENTS

2021/0333547 A1\* 10/2021 Shin ..................... G02B 6/0023

FOREIGN PATENT DOCUMENTS

| JP | 2011-242982 A | 12/2011 |
| JP | 2014-022472 A | 2/2014 |
| JP | 2018-116156 A | 7/2018 |

OTHER PUBLICATIONS

Office Action issued in counterpart Japanese Patent Application No. 2022-568981 mailed Feb. 6, 2024 (8 pages).

\* cited by examiner

*Primary Examiner* — Angela M. Medich
(74) *Attorney, Agent, or Firm* — Osha Bergman Watanabe & Burton LLP

(57) ABSTRACT

The invention relates to a display device (1) comprising:
—a light source (20) designed to generate a source light beam (S) extending over a predetermined wavelength range; —a diffractive optical element (40), the operating range of which is adapted to said wavelength range and which is arranged to receive said source light beam (S) and to transmit an image light beam (I); and —a dichroic filter (50) placed in the path of said image light beam and the passband of which at least partially covers said wavelength range so as to at least partially transmit said image light beam.

13 Claims, 2 Drawing Sheets

(51) Int. Cl.
*B60K 35/10* (2024.01)
*G02B 27/42* (2006.01)
*B60K 35/22* (2024.01)

(52) U.S. Cl.
CPC .............. *B60K 35/10* (2024.01); *B60K 35/22* (2024.01); *B60K 2360/128* (2024.01); *B60K 2360/25* (2024.01); *B60K 2360/332* (2024.01); *B60K 2360/333* (2024.01); *B60K 2360/336* (2024.01)

(58) Field of Classification Search
CPC .......... B60K 2360/128; B60K 2360/23; B60K 2360/34; B60K 2360/345; B60K 2360/126; G02B 5/20; G02B 5/23; G02B 5/28; G02B 27/4205
See application file for complete search history.

[Fig. 1]
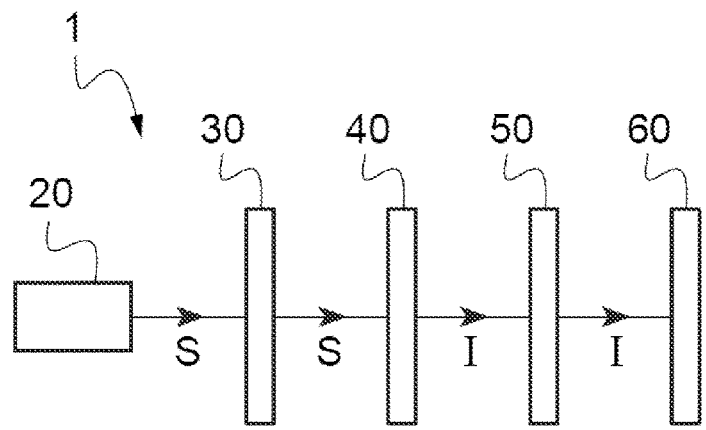
[Fig. 2]
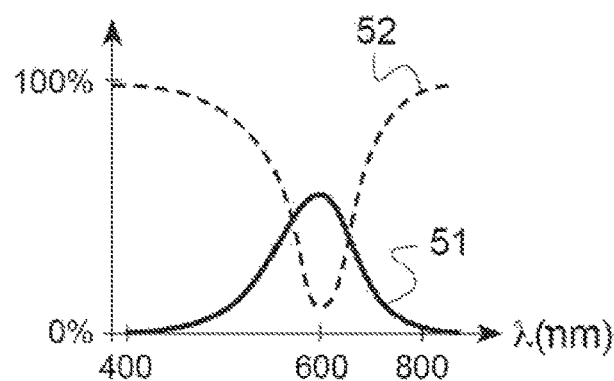
[Fig. 3]
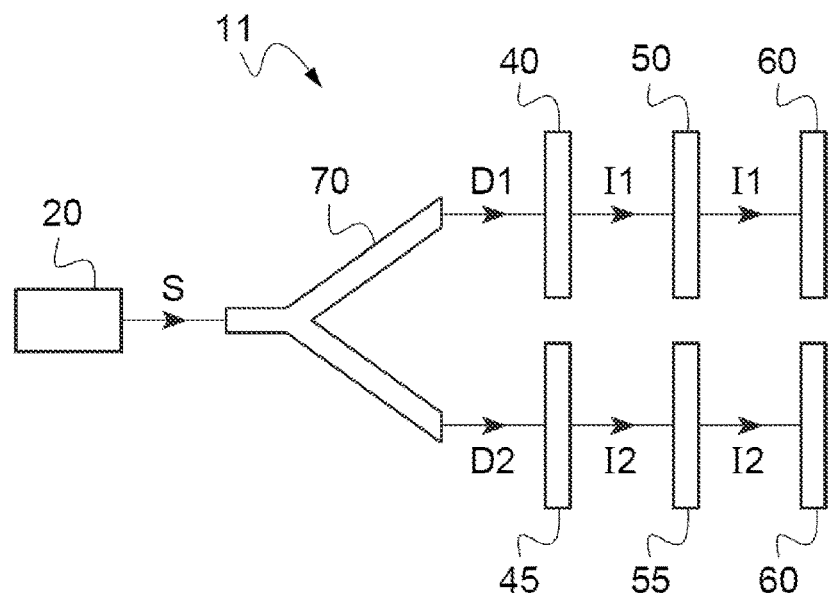

[Fig. 4]
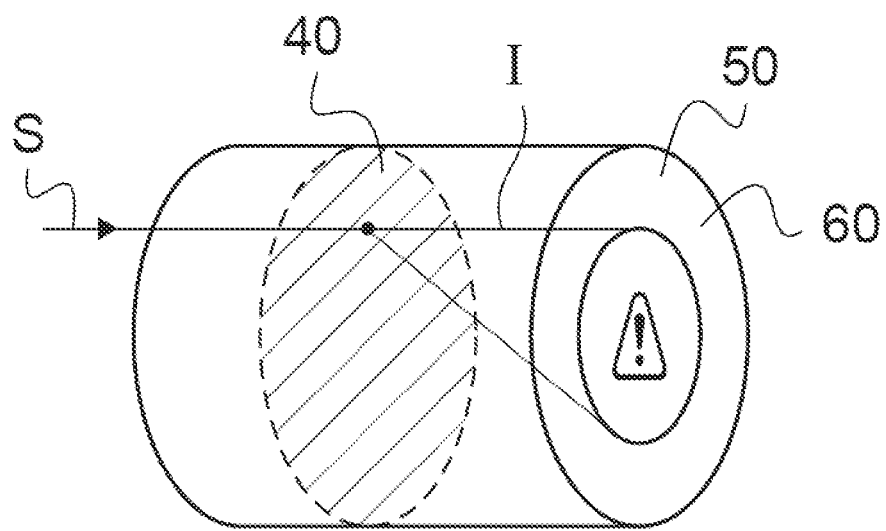
[Fig. 5]
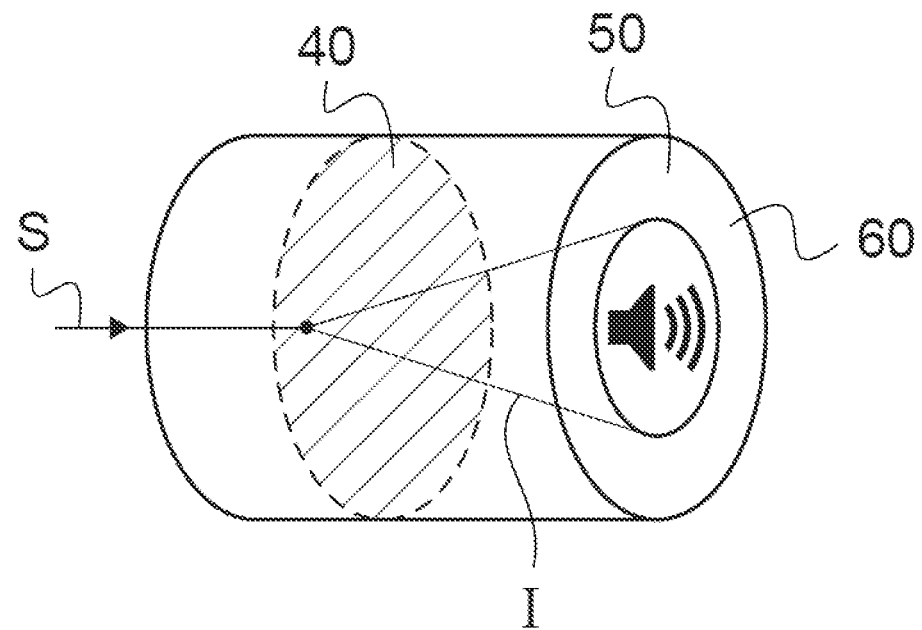

DISPLAY UNIT

TECHNICAL FIELD OF THE INVENTION

The present invention generally relates to the field of display devices.

It more specifically relates to the display devices for a vehicle.

TECHNOLOGICAL BACKGROUND

Some motor vehicles are currently equipped with display systems, for example, of the lamp or indicator type, comprising a light source illuminating a diffraction device forming an image on a transparent or partially transparent surface. These display systems can particularly equip control buttons, for example, for controlling the temperature of the passenger compartment.

These display systems dispense with a mask revealing the character or the symbol even when the lamp is turned off. By virtue of these display systems, the character or the symbol appears to be "floating", i.e., without support, on the transparent surface, which gives it a highly aesthetic appearance.

These display systems are nevertheless sensitive to external light, in particular to solar radiation entering the display device. Indeed, such solar radiation can, on the one hand, cause interference, reflections or stray light disrupting the display of the character or of the symbol and, on the other hand, can cause the light source to heat up, which can cause irreversible damage.

PRESENTATION OF THE INVENTION

In this context, the present invention proposes a display device comprising:
- a light source designed to generate a source light beam extending over a predetermined wavelength range;
- a diffractive optical element, the operating range of which is adapted to said wavelength range and which is arranged to receive said source light beam and to transmit an image light beam; and
- a dichroic filter placed in the path of said image light beam and the passband of which at least partially covers said wavelength range so as to at least partially transmit said image light beam.

Thus, by virtue of the dichroic filter, only a very small amount of external radiation can enter the display device. Only the amount of external radiation corresponding to the passband of the dichroic filter can enter the display device. This reduces the risks of the light source heating up and attenuates any stray light.

Advantageously, the display device comprises:
- a splitter adapted to spatially split said source beam into at least two split light beams;
- another diffractive optical element, the operating ranges of each of the diffractive optical elements being adapted to said wavelength range and each of the diffractive optical elements being arranged to receive one of said split light beams and to transmit an image light beam; and
- another dichroic filter, each of the two dichroic filters being placed in the path of one of the image beams, the passbands of each of the two dichroic filters covering only part of said wavelength range so as to filter said image beams by wavelengths.

This allows different colored symbols to be created from the same light source, with the dichroic filter allowing a predetermined color to be selected. Using a single light source represents a significant space saving, for example.

Other non-limiting and advantageous features of the device according to the invention, taken individually or according to all the technically possible combinations, are as follows:
- said display device further comprises a diffuser disposed in the path of said image light beam;
- said diffractive optical element is movable relative to said light source;
- said diffractive optical element is designed so that said image light beam depends on the relative position of said diffractive optical element relative to said light source;
- said display device further comprises an optical system configured to spatially modulate said source light beam;
- said display device further comprises a light guide;
- said light source comprises at least one light-emitting diode;
- said light source comprises a laser source;
- said dichroic filter is a band-pass, high-pass or low-pass filter;
- said dichroic filter is a band-pass filter and said passband of said dichroic filter is centered on said wavelength range;
- the absorbance of said dichroic filter is non-zero;
- said dichroic filter and said diffuser are bonded by an optical adhesive.

The invention also relates to a control button comprising such a display device.

DESCRIPTION OF THE EMBODIMENTS

The following description with reference to the accompanying drawings, which are provided by way of non-limiting examples, will clearly explain the content of the invention and the production manner thereof.

Of course, the various features, alternative embodiments and embodiments of the invention can be combined with one another in various combinations, as long as they are not mutually incompatible or mutually exclusive.

In the appended drawings:

FIG. 1 is a schematic representation of a display device according to a first embodiment of the invention;

FIG. 2 is a graph representing the properties of a dichroic filter of the display device of FIG. 1;

FIG. 3 is a schematic representation of a display device according to a second embodiment of the invention;

FIG. 4 is a schematic representation of part of the display device of FIG. 1 displaying a first symbol;

FIG. 5 is a schematic representation of the part of the display device of FIG. 1 displaying a second symbol.

In this document, a display device 1 is described in the case whereby it is used to display symbols or characters, for example, numbers, within a motor vehicle, for example, so that a user can view information relating to the operation of the vehicle, such as discrete setpoint temperature values or the status of the lights. The display device 1 can be integrated, for example, into a dashboard of the vehicle. The display device 1 can equip, for example, the surface of a control button. However, the display device 1 also can be applied to any other conceivable use of a light symbol or character that can be turned off or on.

FIGS. 1 and 3 show two embodiments of the display device 1.

In these two embodiments, the display device 1 comprises:
- a light source 20;
- a diffractive optical element 40; and
- a dichroic filter 50.

Firstly, the first embodiment shown in FIG. 1 will be described in detail.

In this first embodiment, as shown in FIG. 1, the display device 1 also comprises:
- an optical system 30;
- a diffuser 60.

The light source 20 is designed to generate a source light beam S extending over a predetermined wavelength range. The wavelength range is an interval of wavelengths that the light source 20 is capable of producing. A width of the wavelength range is, for example, defined by the difference between the shortest wavelength and the longest wavelength that the light source 20 can emit.

Herein, "extending over a wavelength range" is understood to mean that the source light beam S comprises all the wavelengths, at intensities that can be variable, of the wavelength range.

The source light beam S is intended to produce a character or a symbol visible by a user, the wavelength range therefore preferably comprises wavelengths included in the visible domain.

The light source 20 can comprise, for example, a blue light-emitting diode, called LED, provided with a phosphorus layer. The emission spectrum of such a light source 20 is relatively continuous throughout the visible domain. The wavelength range can then comprise the entire visible domain, typically from 400 nm to 700 nm.

The light source 20 can comprise, for example, a laser with a central wavelength within the visible domain. The wavelength range then can be defined by the narrow spectral band around the central wavelength.

The light source 20 also can be a backlit liquid crystal screen, commonly called LCD screen.

In this case, the source light beam S is emitted toward the optical system 30.

The optical system 30 is configured to spatially modulate the source light beam S, i.e., to modify its orientation and/or its dimensions without changing its frequency content.

In this case, the optical system 30 allows the source light beam S to be oriented, for example, using one or more mirrors. The display device 1 can also comprise a light guide. This light guide is included in the optical system 30 in order to allow the source light beam S to be oriented.

In this case, the optical system 30 also allows the dimensions of the source light beam S to be modified, for example, widening or narrowing the source light beam S. The source light beam S can be collimated, for example, by virtue of a lens in order to reach a desired width.

The optical system 30 in this case is configured so that the source light beam S reaches a predetermined area of the diffractive optical element 40 at a predetermined angle of incidence.

The diffractive optical element 40, the operating range of which is adapted to the wavelength range, is arranged to receive the source light beam S and to transmit an image light beam I.

The diffractive optical element 40 can be obtained, for example, by pressing or by injection.

The diffractive optical element 40 in this case is a phase or amplitude mask (better known as a DOE (Diffractive Optical Element) designed to modify the wavefront of the source light beam S so as to obtain a determined illumination distribution of the image light beam I. This illumination distribution defines the symbol or the character associated with the image light beam I.

The operation of the diffractive optical element 40 depends on the utilization wavelengths. The efficiency of the diffractive optical element 40 is optimal for a given wavelength or for a narrow band of wavelengths. The operating range of the diffractive optical element 40 can be defined as the wavelengths for which the efficiency is greater than or equal to a fraction of the optimal efficiency, for example, at 80% of the optimal efficiency. The dependency of the diffractive optical element 40 on the utilization wavelengths can be relatively high. Thus, if the diffractive optical element 40 is illuminated by wavelengths located outside its operating range, the transmitted image light beam I is incoherent and does not produce, or produces in a deformed or non-optimal manner, the desired symbol or character. Moreover, outside the operating range, the dimensions of the transmitted image light beam I are smaller than those of the image light beam I transmitted at the optimum efficiency.

In this case, the operating range of the diffractive optical element 40 covers at least part of the wavelength range of the source light beam S. Preferably, the operating range of the diffractive optical element 40 is wider than, and includes, the wavelength range of the source light beam S.

The image light beam I also depends on the angle of incidence of the source light beam S on the diffractive optical element 40. This angle of incidence is adjusted during the calibration of the display device by virtue of the optical system 30, so as to obtain the desired symbol or character.

Moreover, in this case, the diffractive optical element 40 is designed so that the image light beam I depends on the relative position of the diffractive optical element 40 relative to the light source 20. This means that the image light beam I depends on the area of the diffractive optical element 40 illuminated by the source light beam S. The surface of the diffractive optical element 40 therefore is not uniform but has spatial variations or spatial periodicity.

The diffractive optical element 40 thus can comprise a plurality of areas associated with distinct symbols or characters. When a particular area is illuminated by the source light beam S, this allows a particular selected character or symbol to be produced.

In order to select the area of the diffractive optical element 40 that is illuminated by the source light beam S, provision is made in this case for the diffractive optical element 40 to be movable relative to the light source 20. In this case, the diffractive optical element 40 therefore is also movable relative to the source light beam S. This has the advantage of being able to modify the image light beam I, and therefore the selected character or symbol, while maintaining the position and the orientation of the image light beam I. This allows, for example, the character or the symbol to always be displayed at the same place on the dashboard or the control button.

The diffractive optical element 40 generally can be, for example, in the form of a disc, on which the various areas are circumferentially distributed. With a source light beam S that illuminates the periphery of the disc, the area of the diffractive optical element 40 can be selected by rotating said element. Incremental temperature values can be associated, for example, with successive areas on the periphery of the disc. Such a display device 1 is particularly suitable for a rotary knob for a dashboard.

As an alternative embodiment, provision can be made for a plurality of distinct diffractive optical elements to be arranged on the periphery of a support disc. Each distinct diffractive optical element would allow a particular symbol or character to be produced and its size would be less than that of a single diffractive optical element.

As an alternative embodiment, provision also can be made for the area illuminated by the source light beam to be selected by orienting the source light beam by virtue of the optical system, for example, using movable mirrors.

As shown in FIG. 1, the dichroic filter 50 is placed in the path of the image light beam I. The path of the image light beam I is defined by the direction and the course of propagation of the image light beam I from the diffractive optical element 40.

The dichroic filter 50 has a passband that partially covers the wavelength range so as to at least partially transmit the image light beam I.

In general, the properties of the dichroic filters, also called interference filters, are highly dependent on the wavelength of the incident light beam. Thus, a dichroic filter can be purely transmissive at a certain wavelength and purely reflective at another wavelength.

The dichroic filter 50 can be a filter of the band-pass type, where only the wavelengths of a given interval are transmitted, of the high-pass type, where all the wavelengths above a given threshold are transmitted, or of the low-pass type, where all the wavelengths above a given threshold are transmitted. In this case, a transmitted wavelength does not mean that the efficiency is necessarily 100%, but that at least part of a beam at this wavelength is transmitted. The wavelengths transmitted by the dichroic filter 50 define the passband.

The passband can be defined, for example, as the −3 dB passband relative to the transmission maximum, such as the width at half-maximum of the transmission peak or even as all the wavelengths for which the transmission efficiency is greater than or equal to a threshold value, for example, 10%.

An example of a transmission curve 51 and of a reflection curve 52 of a band-pass dichroic filter 50 is provided in FIG. 2. The transmission curve has a maximum efficiency at 600 nm. This means that this dichroic filter 50 mainly allows through orange light. Conversely, the reflection curve has a minimum at 600 nm. This means that this dichroic filter 50 only very poorly reflects orange light.

In this example, the dichroic filter 50 has a passband approximately extending from 500 nm to 800 nm. In this case, the passband is defined by the wavelengths for which the transmission efficiency is greater than approximately 5%. The width of the passband can be increased in order to increase the total flux of the image light beam I transmitted by the dichroic filter 50, and vice versa.

In this example, the sum of the transmission and reflection efficiencies is not equal to 100%. This corresponds to a case whereby the absorbance of the dichroic filter 50 is non-zero. The dichroic filter 50 then absorbs some of the light passing therethrough, thereby hiding the inside of the display device 1, for example, the light source 20, from the user. In other words, the dichroic filter 50 then has an opacifying effect.

As has been seen, the passband of the dichroic filter 50 at least partially covers the wavelength range of the source light beam S. The passband of the dichroic filter 50 therefore also covers the wavelengths forming the image light beam I. This allows the image light beam I to be at least partially transmitted. The image light beam I also can be partially reflected or absorbed.

"Cover" is understood to mean that the length range and the passband of the dichroic filter 50 have common wavelengths. This means that, for example, the wavelengths of the wavelength range are included in the passband of the dichroic filter 50. These two wavelength intervals, the passband and the wavelength range, can only partially cover and be slightly offset, for example. The passband of the dichroic filter 50 even can be narrower than the wavelength range, or vice versa. The passband of the dichroic filter 50 is preferably wider than the operating range of the diffractive optical element 40. This allows, for example, the design of the optical elements to be facilitated or even allows variations in wavelengths to be tolerated that can be generated by changes in the temperature of the light source 20.

When the dichroic filter 50 is a bandpass filter, provision can be made for the passband of the dichroic filter 50 to be centered over the wavelength range, i.e., the transmission maximum of the dichroic filter 50 corresponds to the central wavelength of the wavelength range. Thus, for a given passband of a dichroic filter, the transmission of the image light beam I is maximum. This allows maximum visibility of the symbol or character.

The passband of the dichroic filter 50 therefore substantially corresponds to the wavelength range for the purpose of disrupting the image light beam I along its path as little as possible.

Advantageously, the dichroic filter 50 allows partial blocking, i.e., in this case, reflecting and to a lesser extent absorbing, of external radiation entering the display device 1. For example, the dichroic filter 50 allows a solar light beam propagating in the opposite direction to the path of the image light beam I to be partially blocked.

External radiation propagating toward the diffractive optical element 40 and toward the light source 20 can cause, on the one hand, light interference or stray light disrupting the display of the character or of the symbol and, on the other hand, causing the light source 20 to heat up, which can cause irreversible damage. The dichroic filter 50 allows this external radiation to be filtered. For example, with the dichroic filter 50 shown in FIG. 2, and in the case of solar radiation, the infrared portion of the radiation is reflected by the dichroic filter 50 and therefore cannot reach the light source 10 and cause it to heat up.

Indeed, only the portion of any external radiation corresponding to the passband of the dichroic filter 50 can enter the display device 1. The dichroic filter 50 therefore represents a protection means for the display device 1.

The dichroic filter 50 can also allow, as previously described, the inside of the display device 1 to be hidden, which makes the display device 1 more aesthetic for the user.

In practice, provision can be made, for example, for the display device 1 to be configured so that the dichroic filter 50 occupies the only opening of the display device 1 toward the outside, for example, toward the passenger compartment of the vehicle. Thus, external radiation in this case should necessarily pass through the dichroic filter in order to enter the display device 1.

As illustrated in FIGS. 4 and 5, such a configuration can be achieved, for example, by arranging the display device 1 in a hollow cylinder comprising an opening on one of its circular faces. In this case, provision can be made for the circular dichroic filter 50 to be placed on this opening, closing this opening, for example.

In order to increase protection, a band-pass dichroic filter 50 can be used, for example, with a narrow passband, for example, less than 100 nm, thus the majority of any external radiation is reflected outward. However, a narrow passband can reduce the intensity of the image light beam I. In order for the image light beam I to maintain sufficient intensity, provision then can be made for the use, in combination with the band-pass dichroic filter 50, of a light source 20 comprising a laser with an emission band that corresponds to the passband. For example, a laser emitting around 600 nm in combination with the dichroic filter shown in FIG. 2.

As shown in FIG. 1, the display device 1 in this case comprises a diffuser 60.

In this case, the diffuser 60 is located after the dichroic filter 50 in the path of the image light beam I. As an alternative embodiment, provision can be made for the diffuser to be placed before the dichroic filter in the path of the image light beam.

The role of the diffuser 60 is to make the symbol or the character associated with the image light beam I visible by a user. Indeed, the image light beam I is not specifically oriented toward the eye of the user. Therefore, it is worthwhile "projecting" the symbol or the character associated with the image light beam I onto the diffuser in order to make the symbol or the character visible.

The diffuser 60 can have a preferred direction of diffusion that is then oriented towards an area where the head of the user is located. The diffuser 60 can also evenly diffuse in order to be visible irrespective of the position of the user.

The diffuser 60 can be made of plastic, for example, made of polycarbonate.

The diffuser 60 can be bonded to or in optical contact with the dichroic filter 50. The diffuser 60 and the dichroic filter 50 are bonded by an optical adhesive, for example.

In FIGS. 4 and 5, the display device 1 is arranged in a hollow cylinder. The diffractive optical element 40 in this case is a disc, on which various areas (not shown) are distributed over the periphery of the disc. As shown in FIGS. 4 and 5, selecting the position of the source light beam S on the diffractive optical element 40, i.e., selecting the illuminated area, allows a specific character or symbol to be selected.

When transitioning from the configuration of FIG. 4 to that of FIG. 5, the change in area of the diffractive optical element 40 illuminated by the source light beam S can occur by rotating the diffractive optical element 40 about its axis, which in this case is coincident with the axis of the hollow cylinder. In this case, this rotation of the diffractive optical element 40 is schematically represented by a movement of the source light beam S.

In FIGS. 4 and 5, the diffuser 60 and the dichroic filter 50 are bonded by an optical adhesive. The diffuser 60 and the dichroic filter 50 are disposed on a circular face of the hollow cylinder. The symbol or character is then displayed on this circular face.

In a second embodiment shown in FIG. 3, the display device 1 comprises:
- a splitter 70;
- the diffractive optical element 40, called first diffractive optical element 40;
- a second diffractive optical element 45;
- the dichroic filter 50, called first dichroic filter 50; and
- a second dichroic filter 55.

In this case, the display device 1 also comprises the diffuser 60, called first diffuser 60, and a second diffuser 65.

The splitter 70 is adapted to spatially split the source beam into at least two split light beams D1, D2, in this case into a first split light beam D1 and a second split light beam D2. To this end, the splitter 70 can comprise, for example, a semi-transparent mirror, thus the source light beam S is split into two split light beams D1, D2 each having an intensity that is two times less than that of the source light beam S.

In this case, the splitter 70 also provides the functions of spatial modulation of the source light beam S exerted by the optical system 30 in the first embodiment. The splitter 70 can independently modulate each split light beam D1, D2.

Each split light beam D1, D2 then illuminates one of the two diffractive optical elements 40, 45. Each diffractive optical element 40, 45 is arranged to receive one of the two split light beams D1, D2 and to each transmit an image light beam 11, 12. In this case, the first diffractive optical element 40 receives the first split light beam D1 and transmits a first image light beam 11 and the second diffractive optical element 45 receives the second split light beam D2 and transmits a second image light beam 12.

The operating ranges of each of the diffractive optical elements 40, 45 are adapted to the wavelength range of the source light beam S. The operating range of each diffractive optical element 40, 45 is therefore adapted to the wavelengths included in the split light beams D1, D2.

The second diffractive optical element 45 can have properties similar to those of the previously described first diffractive optical element 40. However, the design of the two diffractive optical elements 40, 45 can differ so that the image light beams 11 and 12 are associated with distinct symbols or characters.

Each of the two dichroic filters 50, 55 is disposed in the path of one of the two image light beams 11 and 12. In this case, as shown in FIG. 3, the first dichroic filter 50 is disposed in the path of the first image light beam 11 and the second dichroic filter 55 is disposed in the path of the second image light beam 12.

The passband of each dichroic filter 50, 55 at least partially covers the wavelength range of the source light beam S. This allows the display system to be protected, as described in the first embodiment.

After filtering, each image light beam 11, 12 is then "projected" onto a diffuser 60, 65 to make it visible by a user. In this case, as shown in FIG. 3, the first diffuser 60 is disposed in the path of the first image light beam 11 and the second diffuser 65 is disposed in the path of the second image light beam 12. The properties thereof are similar to those described in the first embodiment. As previously described, the diffusers 60, 65 can be combined with the dichroic filters 50, 55.

In this second embodiment, the passband of each dichroic filter 50, 55 more specifically covers only part of the wavelength range so as to filter the light beams 11, 12 by wavelengths. The passband of each dichroic filter 50, 55 is predetermined as a function of the desired color for the symbol or the character associated with each image light beam 11, 12.

Preferably, the passbands of the two dichroic filters 50, 55 are distinct and included in the wavelength range of the source light beam S. Thus, from the same light source 20, two symbols or characters with different colors can be displayed.

For example, the light source 20 is a blue LED provided with a phosphorus layer; consequently, the length range covers at least the visible domain. A first dichroic filter 50 with a passband of approximately 600 nm then can allow an orange symbol to be produced. While a second dichroic filter 55 with a passband of approximately 450 nm can allow a blue symbol to be produced. The shape of the symbols or characters for its part depends on the diffractive optical elements.

Using a single light source 20 to illuminate several symbols or characters represents a saving in terms of cost, space and design simplicity. Space saving is particularly sought after in vehicle dashboards where space is limited.

In the display device 1 shown in this second embodiment, the splitter splits the source light beam S into two split light beams D1, D2. Of course, it is possible to split the source light beam S into more than two split light beams so as to optimize the ratio of the light source S to the number of displayed characters or symbols, which can have different colors.

The invention claimed is:

1. A display device comprising:
 a light source configured to generate a source light beam extending over a predetermined wavelength range;
 a diffractive optical element, the operating range of which is adapted to said wavelength range and which is arranged to receive said source light beam and to transmit an image light beam; and
 a dichroic filter placed in the path of said image light beam and the passband of which at least partially covers said wavelength range so as to at least partially transmit said image light beam.

2. The display device as claimed in claim 1, further comprising: a diffuser disposed in the path of said image light beam.

3. The display device as claimed in claim 2, wherein said diffractive optical element is movable relative to said light source.

4. The display device as claimed in claim 3, wherein said dichroic filter and said diffuser are bonded by an optical adhesive.

5. The display device as claimed in claim 1, wherein said diffractive optical element is designed so that said image light beam depends on the relative position of said diffractive optical element relative to said light source.

6. The display device as claimed in claim 1, further comprising an optical system configured to spatially modulate said source light beam.

7. The display device as claimed in claim 1, further comprising a light guide.

8. The display device as claimed in claim 1, wherein said light source comprises at least one light-emitting diode.

9. The display device as claimed in claim 1, wherein said light source comprises a laser source.

10. The display device as claimed in claim 1, wherein said dichroic filter is a band-pass, high-pass or low-pass filter.

11. The display device as claimed in claim 1, wherein said dichroic filter is a band-pass filter and wherein said passband of said dichroic filter is centered on said wavelength range.

12. The display device as claimed in claim 1, comprising:
 a splitter adapted to spatially split said source beam into at least two split light beams;
 another diffractive optical element, the operating ranges of each of the diffractive optical elements being adapted to said wavelength range and each of the diffractive optical elements being arranged to receive one of said split light beams and to transmit an image light beam; and
 another dichroic filter, each of the two dichroic filters being placed in the path of one of the image beams, the passbands of each of the two dichroic filters covering only part of said wavelength range so as to filter said image beams by wavelengths.

13. A control button comprising a display device as claimed in claim 1.

* * * * *